United States Patent [19]

Klein

[11] Patent Number: 5,283,766
[45] Date of Patent: Feb. 1, 1994

[54] METHOD AND APPARATUS FOR SIMULATION OF PROPULSION NOISES OF SELF-PROPELLED SHIPS

[75] Inventor: Wolfgang Klein, Bodman-Ludwigshafen, Fed. Rep. of Germany

[73] Assignee: Dornier GmbH, Friedrichshafen, Fed. Rep. of Germany

[21] Appl. No.: 535,951

[22] Filed: May 23, 1990

[51] Int. Cl.$^5$ ............................................... H04K 3/00
[52] U.S. Cl. .......................................... 367/1; 367/142
[58] Field of Search ........................... 367/1, 142, 143; 181/120; 116/27

[56] References Cited

U.S. PATENT DOCUMENTS 4,007,805 2/1977 Reber ........................ 181/120

Primary Examiner—Daniel T. Pihulic
Attorney, Agent, or Firm—Anderson Kill Olick & Oshinsky

[57] ABSTRACT

Simulation of ship's noises by means of liquid jets penetrating into the water.

26 Claims, 2 Drawing Sheets

METHOD AND APPARATUS FOR SIMULATION OF PROPULSION NOISES OF SELF-PROPELLED SHIPS

The invention is directed to a method and an apparatus for simulation of ship's noises in water, especially of ships of high tonnage, preferably to be used in defense technology.

It is known to simulate noises similar to those caused by ships by means of mechanical devices. These devices do not, however, satisfy all the requirements concerning frequency response and level.

It is also known that continuous jets of water generate noises of relatively high frequency as a function of jet diameter and velocity.

The invention is based upon the task of creating an effective apparatus for noise simulation of ships as far as level and frequency is concerned, especially in the frequency range below 50 Hz.

This task is solved in the invention by the teaching contained in the patent claims. The dependent claims describe realization possibilities and utilization methods.

In the following the invention is described with particularity with the use of figures.

It is shown on:

Figure 1:
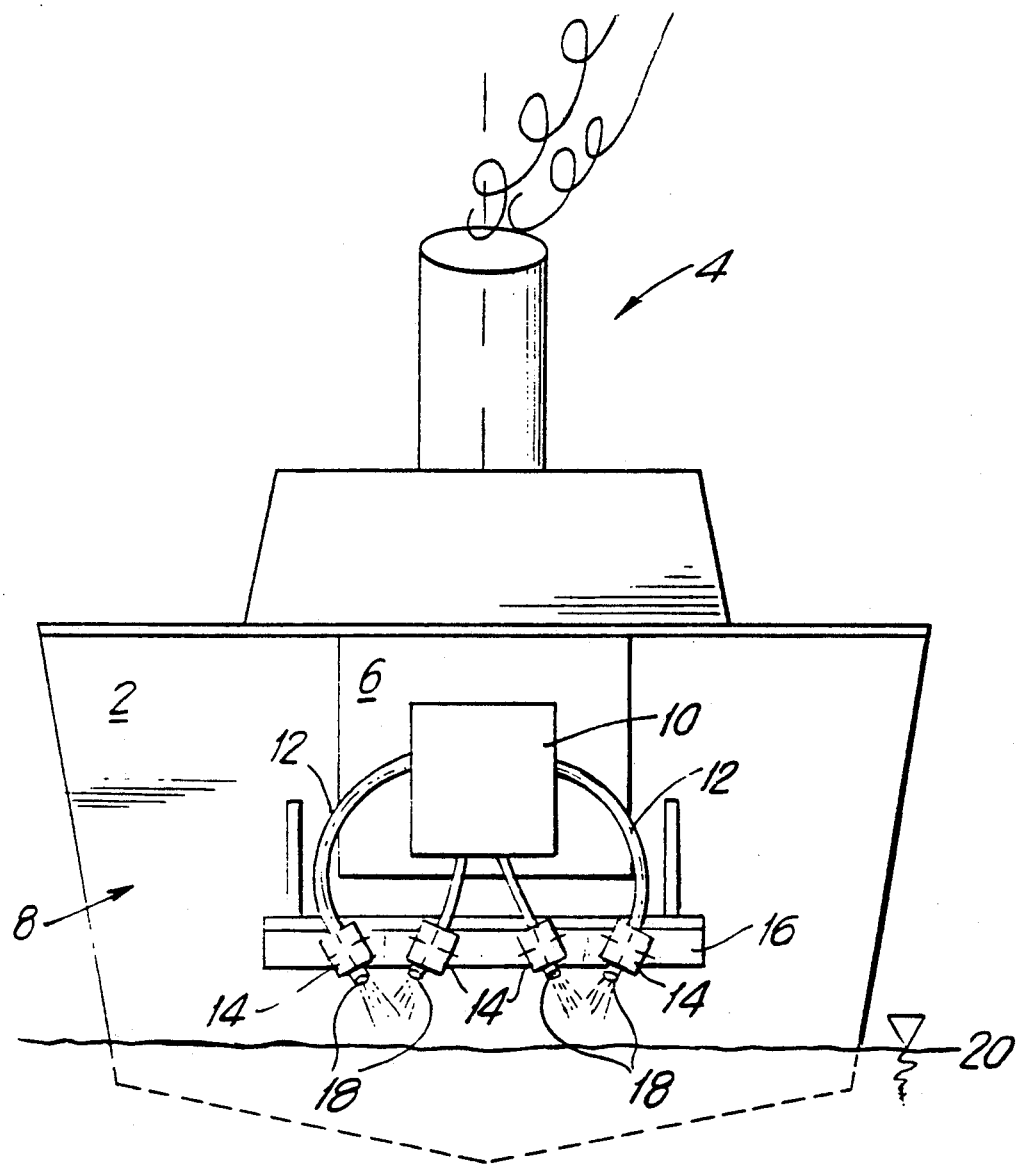
FIG. 1 is a diagrammatic drawing of the subject in the invention.

FIG. 1 shows ships hull with various superstructures 4 viewed from the stern. A pumping aggregate 10 is located in a recess 6 in the stern 8, which is supplied with water through a suction arrangement shown in FIG. 2 and on the drainage side is in connection with nozzles 14 by means of pressure hoses 12. The nozzles 14 are fastened at a platform 16 connected with the ship's hull. Four nozzles 14 are shown in the figure. The water jets 18 issuing from the nozzles run at anangle to each other. The nozzles can be rigidly connected to the platform or they can however be articulated to the platform 16 as swivelling nozzles adjustable manually or by means of motors.

The water jet 18 issuing from the nozzles discharges into the water level 20 after passing through a free distance, wherein with an appropriate pressure output of the pump and diameter of the nozzle matched thereto a sound in the low frequency range of 1 to 50 Hz is generated.

Figure 2:
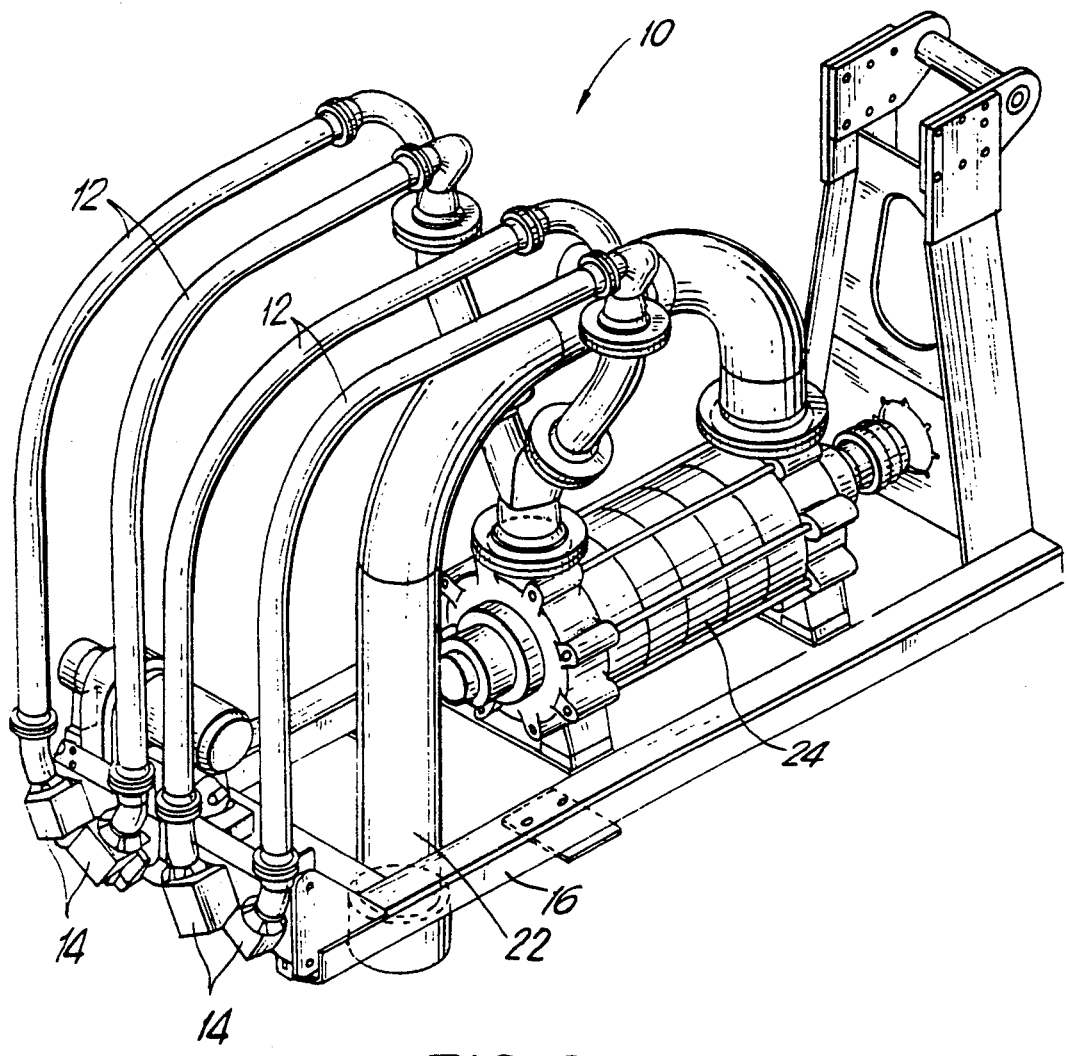
FIG. 2 is a pumping aggregate with the apparatus in the invention shown in axonometric projection.

FIG. 2 shows a pumping aggregate 10, wherein the pump 24 and the previously described components can be clearly discerned.

The cross-over point of the jets 18 in FIG. 1 is chosen to lie at the water level 20.

The height of the jet outlet apertures above the water level and the location of the crossing point are adjustable according to the desired sound level.

The adjustable swivelling frequency of the nozzles 14 is in direct connection with the lowest frequency share of the noise which is to be simulated.

In tests performed with the aggregate shown in FIG. 2, the water was aspirated beneath the watercraft by a pump 24 and pressed through hoses 12 into the nozzles 14. The pump pressure, the jet diameter and the swivelling frequency are adjustable as required and the desired ship's noise spectra can be simulated with any desired precision.

I claim:

1. Method of simulating ships noises in water, especially ships of high tonnage, preferably for use in defense technology, comprising the steps of drawing water into a relatively small watercraft in a body of water having a water level, pumping the drawn water in liquid jets downwardly from the watercraft into the body of water from a location above the water level.

2. Apparatus for simulating ships noise in water, especially ships of high tonnage, preferably for defense technology, comprising a relatively small watercraft, first means in said watercraft for drawing water from a body of water having a water level with the watercraft located in the body of water, and second means connected to said first means for receiving water from said means and for directing water jets downwardly from above the water level into the body of water.

3. Apparatus, according to claim 2, wherein said water jets are arranged to impact against the water level at an angle approximately between 45° and 90° with the water level.

4. Apparatus, according to claim 2, wherein said second means comprises jet exit devices for issuing the water jets located at outlet ends of pressure hoses.

5. Apparatus, according to claim 4, wherein said jet exit devices are nozzles.

6. Apparatus, according to claim 5, wherein said nozzles are spaced laterally apart from one another.

7. Apparatus, according to claim 6, wherein the spacing between adjacent nozzles is approximately 20 cm.

8. Apparatus, according to claim 5, wherein said nozzles are arranged to be rotatable for adjustably swiveling the water jet issuing therefrom.

9. Apparatus, according to claim 5, wherein a periodically acting swiveling device is connected to at least one of said nozzles.

10. Apparatus, according to claim 4, wherein at least one of said jet exit devices is arranged to intermittently produce the water jet.

11. Apparatus, according to claim 4, wherein at least one of said jet exit devices generates two water jets simultaneously.

12. Apparatus, according to claim 4, wherein at least two water jets generated by at least two said jet exit devices strike one another at or above the water level.

13. Apparatus, according to claim 12, wherein the striking of two water jets is formed by a periodically acting swiveling arrangement of at least one of said jet exit devices for producing a periodically intermittent striking effect.

14. Apparatus, according to claim 13, wherein one of intermittent generation of the water jets or periodic swiveling of the water jets is program controlled.

15. Apparatus, according to claim 12, wherein said jet exit devices are arranged so that the water jets strike one another at a point located directly above the water level.

16. Apparatus, according to claim 15, wherein the point where the water jets strike one another is located at a distance of less than 50 cm above the water level.

17. Apparatus, according to claim 12, wherein the point at which the jets strike one another is located at the water level.

18. Apparatus, according to claim 2, wherein said first means comprises a pump including a water suction device, and said second means comprises connecting hoses connected to said pump with jet exit devices at the ends of said hoses remote from said pump, and control mechanisms.

19. Apparatus, according to claim 2, wherein said watercraft is an open watercraft.

20. Apparatus, according to claim 2, wherein the water jets provided by said second means afford impulses for effecting noise simulation and simultaneously propelling the watercraft.

21. Apparatus, according to claim 20, wherein the simulated ships noise is in a frequency range of 0 to 100 Hz indistinguishable from noises produced by ships in the range of high speed boats to destroyers, freighters and tankers.

22. Apparatus, according to claim 4, wherein that said first means has pumping outputs up to 120 Kw and pressures up to 18 Hp (18 Hp=18 hecto pascal=$18 \times 10^2$ N/m$^2$) and are used for noise simulation and the jet exit devices have exit diameters in the range of 10 mm to 30 mm.

23. Apparatus, according to claim 22, wherein the jet exit diameters are in the range of approximately 18 mm to 22 mm.

24. Apparatus, according to claim 21, wherein said jet exit devices have a frequency spectrum run automatically or cycled in a preprogrammed manner.

25. Apparatus, according to claim 2, wherein said first and second means are operated by a remote control.

26. Apparatus, according to claim 22, wherein said jet exit diameters receive water from a pump in the watercraft aspirating the water from the body of water with the pump compressing the water to a specific pressure, and a swiveling mechanism with at least one jet exit device operating for simulating the noise of ships.

* * * * *